United States Patent Office 2,765,223
Patented Oct. 2, 1956

2,765,223
BUFFING COMPOSITIONS

Ellsworth T. Candee, Watertown, and Samuel Lewis Doughty, Southington, Conn., assignors to The Lea Manufacturing Company, a corporation of Connecticut No Drawing. Application August 5, 1952,
Serial No. 302,826

6 Claims. (Cl. 51—301)

This invention relates to buffing compositions and is particularly directed to an improved liquid buffing composition which is especially well suited for silver buffing and polishing operations on a commercial scale. The new buffing composition consists essentially of an improved glue-base binder which together with a finely-divided abrasive is intimately dispersed in water.

It is common practice to employ buffing compositions of a solid type in finishing silverware. Such compositions are plastic solids at normal temperatures and are used by pressing the solid composition against a buffing wheel. They are prepared by dispersing abrasive particles throughout a grease vehicle or a glue-base vehicle. Such compositions are difficult to apply with consistent ease and economy, although they have heretofore been the standard form of buffing composition employed commercially for producing fine finishes on metal articles.

Liquid buffing compositions composed essentially of a liquid vehicle, such as kerosene or water, in which a grease is dissolved or dispersed and in which the abrasive particles are suspended, have been proposed. Such liquid buffing compositions are more convenient to use than are the solid buffing compositions. However, buffing compositions of the greaseless type, which are much favored for commercial buffing of silverware, have not been made successfully heretofore.

In our copending U. S. patent application Serial No. 152,754, now abandoned, we have disclosed a new grease-base buffing composition which is advantageously prepared in a solid form and is then made ready for use in the liquid form by stirring it with warm water in which it emulsifies readily. This new buffing composition consists essentially of a grease in which a non-ionic, surface-active emulsifying agent and particles of the finely-divided abrasive are intimately dispersed. When the composition is emulsified with water, the water forms a continuous phase, and dispersed therein are emulsified particles of the grease in which the particles of abrasive are enveloped. Such liquid buffing compositions have the advantages and limitations of grease-base buffing compositions and the convenience in use that comes from their liquid form, but of course they are not well suited for the uses that customarily call for a glue-base buffing composition.

We have now discovered that it is possible to prepare liquid buffing compositions of the glue-base type which are stable over long periods of time, provided a non-jelling liquid glue is employed in their preparation, in combination with a non-ionic surface-active emulsifying agent. The new buffing composition of this invention is composed of a binder which is intimately dispersed in water along with a finely-divided abrasive. The binder consists essentially of 5% to 50% by weight of a non-jelling liquid glue, 5% to 60% by weight of diethylene glycol, 2% to 50% by weight of a fatty acid grease, and 1% to 25% by weight of a non-ionic surface-active emulsifying agent. Within the above-stated limits, particularly satisfactory binder compositions consist essentially of 20% to 35% by weight of the non-jelling liquid glue, 20% to 55% by weight of the glycol, 10% to 25% by weight of the fatty acid grease, and 2% to 20% by weight of the non-ionic emulsifying agent. These composition figures all are on the weight of the binder itself. The binder is then dispersed in water, in the proportions of 25% to 75% by weight water (generally it is best to limit the water to the narrower range of 30% to 50% by weight) and the balance binder; and to the resulting liquid is added an amount of abrasive which is in the range from 35% to 70% by weight of the complete composition, and which for most purposes is present in the narrower range from 45% to 60% by weight of the complete composition. Thus in general the liquid buffing composition in finished form consists essentially of 1% to 15% of non-jelling liquid glue, 1% to 20% diethylene glycol, ½% to 20% of the fatty acid grease, ¼% to 5% of non-ionic surface-active emulsifying agent, 35% to 70% of abrasive, and the balance, from 10% to 50%, water (all these percentages are by weight of the finished composition). On this basis of weight percent of the final liquid buffing composition, the composition in its more preferred form consists essentially of 2½% to 10% non-jelling liquid glue, 5% to 10% diethylene glycol, 2% to 10% fatty acid grease, ½% to 3% non-ionic emulsifying agent, 45% to 60% abrasive, and 15% to 40% water.

The glue employed in the composition must always be a non-jelling liquid glue. By the term "liquid glue," we mean an aqueous solution of animal or equivalent glue, preferably a hide glue of medium-to-high or high jelly strength. Such aqueous solution is prepared by dissolving, in the usual manner, one part by weight of glue in from one to three parts by weight of water. Also, a jell depressant such as thiourea, acetic acid, or nitric acid is incorporated in the glue solution to inhibit jelling. The amount of jell depressant used is in accordance with the usual practice in making a non-jelling liquid glue. A typical liquid glue having non-jelling properties and suitable for use in preparing the new buffing composition consists essentially of fifteen parts by weight of hide glue having a jelly strength of 300 gram test, dissolved in thirty parts by weight of water, together with four parts by weight of thiourea as a jell depressant. This particular liquid glue composition is given simply by way of example and not as limiting the invention.

The use in the new composition of a non-jelling liquid glue is necessary in order to preserve the liquid character of the new composition. If the new composition were prepared using animal glue in the manner customary heretofore in making glue-base buffing compositions, it would be liquid only while hot, and would jell into a gelatinous, unusable solid when cold.

Diethylene glycol is used in the buffing composition of this invention in order to reduce the rate of water evaporation when the composition is applied to the buffing wheel. It also serves as a mild lubricant. There are a variety of other substances, and mixtures of substances, capable of performing these same functions in buffing compounds, such as propylene glycol and other dihydric alcohols that are normally liquid at room temperature; glycerine; sorbitol, sucrose, invert sugar, various other sugars, and sugar syrups either alone or in combination with water-soluble lubricants or lubricant emulsions; etc. Accordingly all references to diethylene glycol both in this specification and in the appended claims are to be read as including all equivalent substances and textures of substances, including but not limited to the equivalents mentioned herein.

By the term "grease" we mean any fat or wax which is insoluble in water and has a greasy texture. Generally the grease is solid at room temperature, although greases liquid at room temperature, such as oleic acid, have also been used successfully. The chemical composition or nature of the fat or wax is of no importance to the present invention. By way of example, but not by way of limitation, the following commonly available greases may be employed in accordance with the invention: fatty acids such as stearic acid, palmitic acid, myristic acid and lauric acid; glycerides of the fatty acids such as mono-, di-, and tri-glycerides of lauric, palmitic and stearic acids, and glycerol mon-oleate; such commercial fats as hydrogenated fish oil, hydrogenated tall oil, tallow, and wool fat; petroleum waxes such as paraffin wax and microcrystalline wax; and such natural waxes as beeswax, carnauba wax, and Chinese insect wax. These substances collectively may be identified as greases of the group consisting of higher fatty acids, their glycerides, their ester waxes, and petroleum waxes. The most satisfactory of the above-mentioned greases, for purposes of making the new buffing composition, are the fatty acid greases composed wholly or essentially of a fatty acid or fatty acid glyceride or a mixture thereof. The fatty acid or other grease gives body to the composition and improves its adhesion to the buffing wheel. Also it lubricates somewhat the action of the abrasive thereby leading to a brighter finish on the buffed article than could be obtained if no grease were present in the composition.

Any non-ionic surface-active emulsifying agent may be employed in preparing the new composition. By way of example, we have employed successfully various non-ionic partial esters of fatty acids containing 12 to 18 carbon atoms with hexitol anhydrides, polyoxyethylene hexitol esters and polyoxyethylene fatty acid alcohol esters of such acids (such as polyoxyethylene sorbitol partial ester and polyoxyethylene lauryl esters of lauric acid and of palmitic acid), and polyoxyethylene fatty acids and fatty acid alcohols wherein the acid or alcohol contains from 12 to 18 carbon atoms. All of these surface-active emulsifying agents are of the non-jelling type. While any non-jelling non-ionic surface-active emulsifying agent may be employed successfully in making the new composition, we have obtained particularly satisfactory results using together (1) a non-ionic hexitol ester of a fatty acid containing from 12 to 18 carbon atoms, e. g. sorbitan monopalmitate, and (2) a non-ionic polyoxyethylene hexitol ester of a fatty acid containing from 12 to 18 carbon atoms, e. g. polyoxyethylene sorbitan monopalmitate, each in an amount ranging from ¼% to 1½% by weight of the complete composition. This amount, in terms of the binder composition alone, is generally from 1% to 10% by weight thereof.

The abrasive may be any type of material heretofore used as an abrasive in buffing and like compositions. Such abrasive may be fused aluminum oxide, unfused aluminum oxide, rouge (ferric oxide), amorphous silica, tripoli, emery, garnet, silicon carbide, chromic oxide, etc. The amount of abrasive employed varies depending upon the purpose for which the buffing composition is to be used and also varies depending upon the degree of absorbency of the abrasive itself. For instance, quartz and fused aluminum oxide have almost no water absorbency and require relatively little water to impart free-flowing fluid characteristics to compositions in which they are used. Hence they may be used in relatively large amounts relative to the amount of water present in the composition. On the oher hand, materials such as unfused aluminum oxide and amorphous silica have high absorbency for water and require considerably larger percentages of water to render the material free-flowing; hence they are used in much smaller amounts relative to the proportion of water in the composition.

The non-jelling liquid glue, the diethylene glycol, the fatty acid grease, the emulsifying agent, the abrasive and the water constitute the essential ingredients of the new liquid buffing composition. It may be advantageous, however, to incorporate various other materials in it, such as one or more modifying agents for the grease. By way of example, many of the animal and vegetable oils and pitches may be used as modifying agents for the grease, including fish oils (e. g. menhaden oil), cottonseed oil, soybean oil, oleic acid, tall oil, petroleum oils, soybean pitch, stearin pitch, etc. The purpose of such modifying agents is to produce a grease having optimum hardness, stickiness or other physical properties for the particular use to which the composition is to be put.

In addition, it may be advantageous to incorporate a small amount of a bactericidal or fungicidal agent (say 0.2% by weight) and of an anti-forming agent (say 0.005% by weight) in the composition. The bactericidal or fungicidal agent is particularly important in compositions, in which a fatty acid grease is employed. Sometimes, too, it is advantageous to incorporate a small amount, say 2% by weight, of bentonite clay in the composition to facilitate dispersion of the abrasive.

In preparing the new buffing composition, the binder is first prepared by heating the fatty acid grease to a temperature at which it is molten (say 55° to 95° C.) and stirring into it the liquid glue, the diethylene glycol, and the emulsifying agent so that these ingredients are thoroughly and intimately intermixed. The temperature of the mixture is maintained at about 85° C., and such other ingredients, if any, as the grease modifying agent, the bactericide, the anti-foaming agent, the bentonite, etc., are then stirred into it. Then the proper amount of water is added, the added water and the binder still being maintained at about 85° C., and the binder is thoroughly dispersed in the water so that its grease components are emulsified therein. The proportion by weight of binder to water may vary between about 1:3 and about 3:1. Finally, the abrasive is thoroughly stirred into the emulsion while it is still maintained at a temperature of about 85° C. The end product, upon cooling to room temperature, is an aqueous liquid in which the water-soluble constituents such as the glue and glycol are dissolved, the grease constituents are emulsified, and the solid abrasive particles are suspended. The composition is remarkably stable, with the undissolved components showing no significant tendency to settle out over very long periods of time.

Following are several specific examples of buffing compositions according to the invention:

Example I

| | Percent |
|---|---|
| Liquid glue | 7.7 |
| Diethylene glycol | 9.2 |
| Hydrogenated fish oil fatty acid | 0.9 |
| Oleic acid | 3.3 |
| Polyoxyethylene sorbitan monopalmitate | 0.6 |
| Sorbitan monopalmitate | 0.3 |
| Water | 18.2 |
| Amorphous silica | 57.4 |
| Red iron oxide rouge | 2.0 |

Example II

| | Percent |
|---|---|
| Liquid glue | 5.7 |
| Diethylene glycol | 7.6 |
| Hydrogenated fish oil fatty acid | 0.8 |
| Hydrogenated tallow glyceride | 2.3 |
| Polyoxyethylene sorbitan monopalmitate | 0.4 |
| Sorbitan monopalmitate | 0.2 |
| Water | 34.8 |
| Amorphous silica | 38.6 |
| Fused aluminum oxide | 9.6 |

Example III

| | Percent |
|---|---|
| Liquid glue | 7.7 |
| Diethylene glycol | 12.0 |
| Hydrogenated fish oil fatty acid | 0.5 |
| Oleic acid | 1.7 |
| Polyoxyethylene sorbitan monopalmitate | 0.32 |
| Sorbitan monopalmitate | 0.16 |
| Water | 17.62 |
| Rose Tripoli | 58.0 |
| Red iron oxide rouge | 2.0 |

The new liquid buffing composition is used by dripping, spraying, painting or swabbing it onto a rotating buffing wheel, or, in some cases, by applying it directly to the workpiece to be buffed or polished. It is sufficiently stable so that it may be stored in closed containers for prolonged periods of time and then may be used, with complete success, without taking special steps to re-suspend or re-emulsify the water-insoluble components. The buffing compositions of this invention, being glue-base preparations, do not require the water content to be volatilized before optimum buffing efficiency is attained. In fact, a certain amount of the water must be retained by the composition during the course of the actual buffing operation, else a bright polish on the workpiece will not be attained. This contrasts with the liquid grease-base buffing compositions of our aforementioned application, wherein the water is merely a vehicle which becomes volatilized quite completely before buffing takes place.

The present composition is particularly useful for producing a buffed finish on silverware such as spoons, knives, forks, etc., either of sterling or plated. Since essentially the composition is a glue-base polishing agent, it can be removed with ease from a polished article by washing with water or even by light rubbing with a clean cloth. This fact, plus the ease of using it which results from its liquid form, makes it an especially convenient buffing composition for use in the commercial manufacture of silverware and like products.

We claim:

1. A liquid buffing composition consisting essentially of 1% to 15% by weight of a non-jelling liquid glue, 1% to 20% by weight of diethylene glycol, ½% to 20% by weight of a grease selected from the group consisting of the higher fatty acids, their glycerides, their ester waxes, and petroleum waxes, ¼% to 5% by weight of a non-jelling, non-ionic surface-active emulsifying agent, from 35% to 70% by weight of a finely-divided abrasive, and from 10% to 50% by weight of water, said composition being characterized by being free-flowing and forming a stable emulsion from which the water content need not be volatilized completely before buffing takes place.

2. A liquid buffing composition consisting essentially of 2½% to 10% by weight of a non-jelling liquid glue, 5% to 10% by weight of diethylene glycol, 2% to 10% by weight of a grease selected from the group consisting of the higher fatty acids, their glycerides, their ester waxes, and petroleum waxes, ½% to 3% by weight of a non-jelling, non-ionic surface-active emulsifying agent, from 45% to 60% by weight of a finely-divided abrasive, and the balance from 15% to 40% by weight of water, said composition being characterized by being free-flowing and forming a stable emulsion from which the water content need not be volatilized completely before buffing takes place.

3. In a liquid buffing composition, a binder consisting essentially of 5% to 50% by weight of a non-jelling liquid glue, 5% to 60% by weight of diethylene glycol, 2% to 50% by weight of a grease selected from the group consisting of higher fatty acids, their glycerides, their ester waxes, and petroleum waxes, and 1% to 25% by weight of a non-ionic surface-active emulsifying agent, said binder being intimately dispersible together with a finely-divided abrasive in water.

4. In a liquid buffing composition, a binder consisting essentially of 20% to 35% by weight of a non-jelling liquid glue, 20% to 55% by weight of diethylene glycol, 10% to 25% by weight of a grease selected from the group consisting of higher fatty acids, their glycerides, their ester waxes, and petroleum waxes, and 2% to 20% by weight of a non-ionic surface-active emulsifying agent, said binder being intimately dispersible together with a finely-divided abrasive in water.

5. A liquid buffing composition as defined in claim 1 in which the surface-active emulsifying agent is an ester of a polyhydroxy alcohol with a member of the group consisting of fatty acids and fatty alcohols.

6. A liquid buffing composition as defined in claim 1 in which the surface-active emulsifying agent is selected from the group consisting of partial esters of fatty acids containing 12 to 18 carbon atoms with hexitol anhydrides, polyoxyethylene hexitol esters of fatty acids containing 12 to 18 carbon atoms, polyoxyethylene fatty acid alcohol esters of fatty acids containing 12 to 18 carbon atoms, polyoxyethylene fatty acids containing from 12 to 18 carbon atoms, and fatty acid alcohols containing from 12 to 18 carbon atoms.

References Cited in the file of this patent

UNITED STATES PATENTS

| 1,442,752 | Warmund | Jan. 16, 1923 |
| 1,822,596 | Leather | Sept. 8, 1931 |
| 2,346,928 | Lighthipe | Apr. 18, 1944 |
| 2,390,212 | Fritz | Dec. 4, 1945 |
| 2,516,685 | Douty | July 25, 1950 |
| 2,540,376 | Onkey | Feb. 6, 1951 |

OTHER REFERENCES

Atlas "Surface Active Agents" (1948).

Moilliet and Collie's "Surface Activity," published by Spoon Ltd., London, 1951, pages 342–357.